United States Patent
Walters et al.

(10) Patent No.: US 11,699,156 B2
(45) Date of Patent: Jul. 11, 2023

(54) ADVANCED DATA COLLECTION USING BROWSER EXTENSION APPLICATION FOR INTERNET SECURITY

(71) Applicant: Capital One Services, LLC, McLean, VA (US)

(72) Inventors: Austin Walters, Savoy, IL (US); Vincent Pham, Champaign, IL (US); Jeremy Goodsitt, Champaign, IL (US); Fardin Abdi Taghi Abad, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 141 days.

(21) Appl. No.: 17/021,807

(22) Filed: Sep. 15, 2020

(65) Prior Publication Data
US 2022/0084033 A1 Mar. 17, 2022

(51) Int. Cl.
*G06Q 40/00* (2023.01)
*G06Q 20/40* (2012.01)
(Continued)

(52) U.S. Cl.
CPC ......... *G06Q 20/4016* (2013.01); *G06F 9/542* (2013.01); *G06F 16/955* (2019.01);
(Continued)

(58) Field of Classification Search
CPC ............... G06Q 20/4016; G06F 9/542; G06F 16/955; H04L 63/083; H04L 63/102; H04L 63/1425
See application file for complete search history.

(56) References Cited

U.S. PATENT DOCUMENTS 8,386,381 B1 * 2/2013 Barton .................. G06Q 20/40
705/35
8,468,597 B1 * 6/2013 Warner .................. H04L 51/212
709/225

(Continued)

FOREIGN PATENT DOCUMENTS

WO WO-2014206203 A1 * 12/2014 ......... G06F 17/3089
WO 2017103326 A1 6/2016

OTHER PUBLICATIONS

Durga et al: "Automatic Detection of Illegitimate Websites with Mutual Clustering" International Journal of Electrical and Computer Engineering (IJECE), vol. 6, No. 3, Jun. 2016, pp. 995-1001 (Year: 2016).*

*Primary Examiner* — Edward J Baird
(74) *Attorney, Agent, or Firm* — Hunton Andrews Kurth LLP (57) ABSTRACT

A browser extension application is configured to collect data relating to the user's browsing activity and display notifications on a user interface. A user can instruct a web browsing application to navigate to a website. The browser extension application can detect a type of the webpage, and based on the type of the webpage, collect certain information relating to what the webpage is asking the user to provide and what the user is providing to the webpage. The browser extension application can transmit this information to a browser extension server. The browser extension server can determine a likelihood that the website is associated with instances of hacking online accounts. The browser extension server can transmit a signal to the browser extension application of the user's computing device. The browser extension application can take an action, e.g., direct the user to another website or log out of the user's account.

10 Claims, 6 Drawing Sheets

(51) Int. Cl.
  *H04L 9/40*       (2022.01)
  *G06F 9/54*       (2006.01)
  *G06F 16/955*     (2019.01)

(52) U.S. Cl.
  CPC .......... *H04L 63/083* (2013.01); *H04L 63/102* (2013.01); *H04L 63/1425* (2013.01)

(56) References Cited

U.S. PATENT DOCUMENTS

| | | | | |
|---|---|---|---|---|
| 8,533,821 | B2* | 9/2013 | Crume | H04L 63/1466 713/169 |
| 8,620,739 | B1 | 12/2013 | Frederick et al. | |
| 9,129,274 | B1 | 9/2015 | Mocko et al. | |
| 9,324,098 | B1 | 4/2016 | Agrawal et al. | |
| 10,176,477 | B2 | 1/2019 | Killian et al. | |
| 11,082,448 | B2* | 8/2021 | Bagarolo | H04L 63/1483 |
| 2010/0211448 | A1 | 8/2010 | Beenau et al. | |
| 2010/0250382 | A1 | 9/2010 | Babaria | |
| 2011/0166922 | A1 | 7/2011 | Fuerstenberg | |
| 2012/0158584 | A1 | 6/2012 | Behren et al. | |
| 2012/0158654 | A1 | 6/2012 | Behren et al. | |
| 2013/0086254 | A1* | 4/2013 | Bhola | H04L 63/1433 709/224 |
| 2013/0290087 | A1 | 10/2013 | Merwarth et al. | |
| 2014/0122196 | A1 | 5/2014 | Cheung et al. | |
| 2014/0258107 | A1 | 9/2014 | Grigg et al. | |
| 2014/0279615 | A1 | 9/2014 | Levin et al. | |
| 2015/0026031 | A1 | 1/2015 | Mullin, III | |
| 2015/0161642 | A1 | 6/2015 | Pastore et al. | |
| 2015/0213451 | A1* | 7/2015 | Santhana | G06Q 20/322 705/44 |
| 2015/0363757 | A1 | 12/2015 | Mocko et al. | |
| 2016/0042381 | A1 | 2/2016 | Braine et al. | |
| 2016/0125371 | A1 | 5/2016 | Grassadonia et al. | |
| 2016/0125445 | A1 | 5/2016 | Jaladi | |
| 2017/0221064 | A1* | 8/2017 | Turgeman | H04W 12/06 |
| 2017/0346851 | A1* | 11/2017 | Drake | H04L 9/0838 |
| 2018/0013789 | A1* | 1/2018 | Damian | H04L 63/0236 |
| 2018/0053114 | A1* | 2/2018 | Adjaoute | G06Q 20/4016 |
| 2018/0131708 | A1* | 5/2018 | Pirttilahti | H04L 61/4511 |
| 2018/0165703 | A1 | 6/2018 | Oshry et al. | |
| 2018/0276654 | A1 | 9/2018 | Chatterjee et al. | |
| 2019/0156363 | A1 | 5/2019 | Postrel | |
| 2019/0197574 | A1 | 6/2019 | Berman | |
| 2019/0236642 | A1 | 8/2019 | Winner et al. | |
| 2020/0302446 | A1* | 9/2020 | Kledaras | G06Q 20/4093 |

* cited by examiner

ADVANCED DATA COLLECTION USING BROWSER EXTENSION APPLICATION FOR INTERNET SECURITY

BACKGROUND

The Internet represents an insecure channel for exchanging information which leads to a high risk of fraud, such as phishing, online viruses, trojans, worms and more. Many methods are used to protect the transfer of data, including encryption and from-the-ground-up engineering. Internet security is a branch of computer security related to the Internet, e.g., browser security, and network security as it applies to other applications or operating systems. An objective of internet security is to establish rules and measures to use against attacks over the Internet.

SUMMARY

An Internet security problem is that oftentimes a user provides sensitive information to a computer system through a website without knowing whether the computer system and the website are trustworthy. For example, many websites require opening a new account if the user is interested in taking advantage of the websites' services. However, opening a new account will require the user to provide sensitive information such as personal or even financial information (or even require the user to install malwares and trackers), and if these websites are not trustworthy, the websites can gather, exploit, distribute or even sell the user's information. This information can expose the user to hacking or even fraud because many users use the same credentials and information to create accounts, e.g., first and last name as the username and mother's maiden name for resetting the password. Sharing private information with untrustworthy websites can have grave consequences for the user. For example, in the context of entering a password for an online account, the user might share the same password on several websites. If the website shares the user's password with fraudsters, they can guess the user's usernames, attempt the user's password on other platforms, and potentially gain access to the user's accounts. A compromised account can be used as a vehicle for spamming other accounts, impersonating the user or even order products on the Internet. As such, it is an object of the present disclosure to describe a method and system for a user to determine a website's trustworthiness prior to interacting with the website.

These problems also appear in the context of Internet transactions. For example, in the context of ordering products on a website, there can be adverse consequences if the user provides the user's financial information to a fraudulent website. For example, a fraudulent website can sell the user's credit card information to criminal organizations, which can in turn use the credit card information to purchase products online. Therefore, it is an objective of this disclosure to provide a system and method which can warn the user prior to share the user's financial information on a fraudulent website.

An objective of this disclosure is to provide a system and method which can facilitate user interactions with the Internet and web browsers by informing the user about the consequences of a user taking an action on a particular website using a browser extension. In an example embodiment, a user interface is provided for receiving instructions from a user on a computing device. The interface can display a web browser application which is coupled with a browser extension application. The browser extension application is configured to collect data relating to the user's browsing activity and display notifications on the user interface. The browser extension application can also collect data relating to information provided by the user on the website. The browser extension application can transmit the data to a browser extension server and receive signals from the browser extension server. The signals can instruct the browser extension application to display messages and/or take an action, e.g., direct the user to another website, log out of the user's account or delete items in the user's electronic shopping cart.

A user can instruct the web browsing application to navigate to a website. The user can start an action on the website, e.g., sign up for an account, log into the account, or order products on the website. The browser extension application can detect a type of the webpage, and based on the type of the webpage, collect certain information relating to what the webpage is asking the user to provide and what the user is providing to the webpage. The browser extension application can transmit this information to the browser extension server.

The browser extension server include at least one database for storing data gathered from a plurality of sources. The data can include browsing history data (what websites a plurality of users visited and what information the users provided to the website) and fraud attack data (what fraud attacks did the users face, e.g., account hacking or credit card transactions). Using on the aggregated data received from a plurality of computing devices as well servers (e.g., service provider system), the browser extension server can determine a likelihood that a website is associated with fraudulent activity.

When the browser extension server makes a determination about a website being visited by a user, the browser extension server can transmit a signal to the browser extension application of the user's computing device. In response to receiving the signal, the browser extension application can take an action, e.g., direct the user to another website, log out of the user's account or delete items in the user's electronic shopping cart.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

The disclosed systems, methods, and computer-readable media include a browser extension application configured to detect various data when a user is browsing web pages and use the data to enhance internet security for the user. In particular, the disclosed browser extension application may detect various data when a user visits a web page and transfer the data from a client device to a server. The server can aggregate the data received from multiple users. The server can also receive data from other sources, e.g., merchant systems. This data can demonstrate incidents of illicit activity such as hacking or fraud. Based on the totality of the data, the server can determine a likelihood that a website is associated with illicit activity. Based on this determination, the server can transmit a signal to the browser extension application of the client device to display a message to the user to warn the user against disclosing confidential information over the web page. In one example embodiment, the server can transmit a signal to the browser extension application to terminate a user's transaction on or engagement with the web page. In these and other manners, the disclosed browser extension application represents an improvement over conventional browser extension applications. Specifically, the disclosed browser extension application improves internet security by discouraging users from sharing confidential information on insecure and fraudulent web sites.

Figure 1:
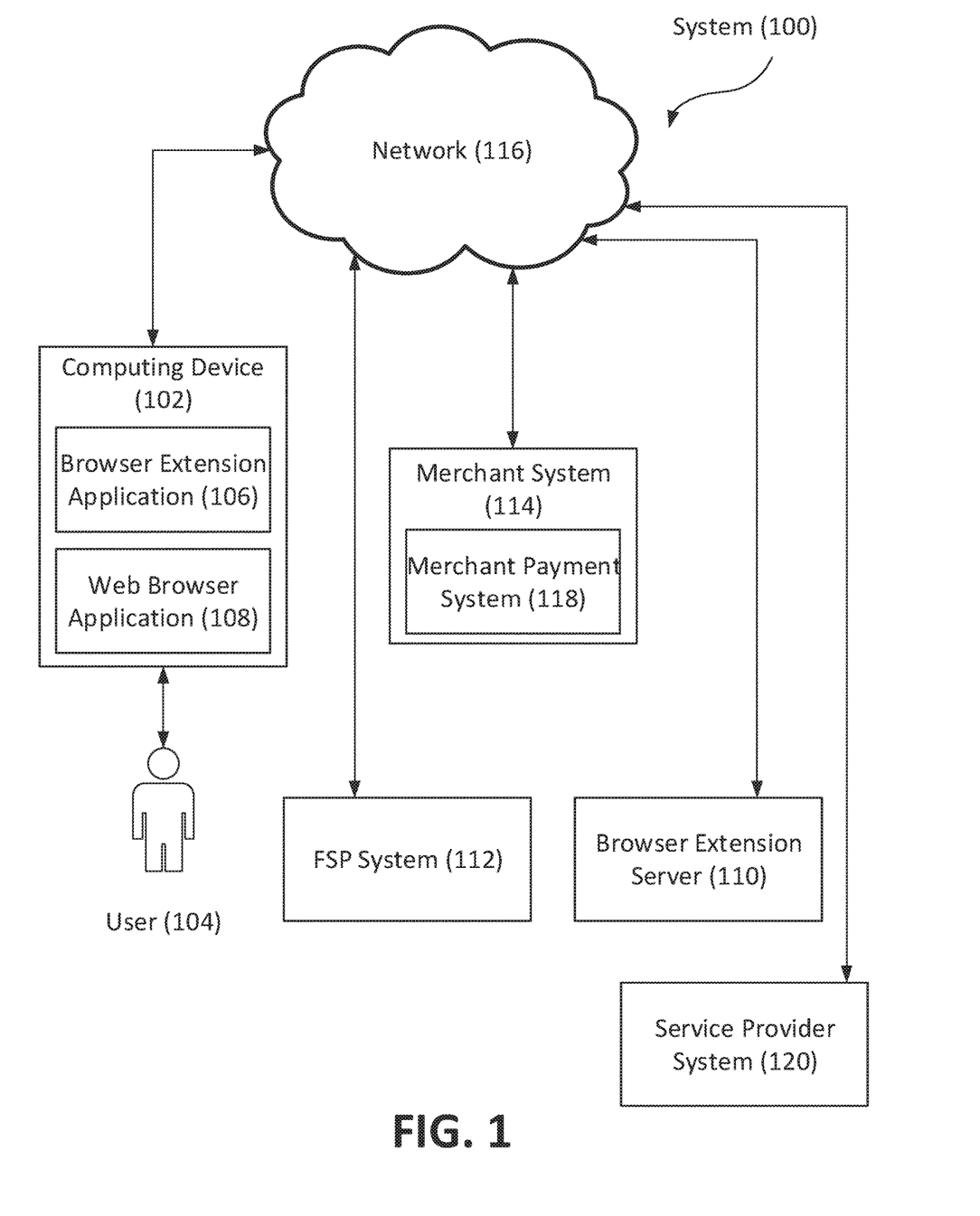
FIG. 1 is a block diagram of an exemplary system 100, consistent with disclosed embodiments.

FIG. 1 is a block diagram of an exemplary system 100, consistent with disclosed embodiments. System 100 may be configured for performing a browser extension process consistent with disclosed embodiments.

As shown, system 100 may include a computing device 102 associated with a user 104. Computing device 102 may be configured to execute, among other programs, a browser extension application 106 and a web browser application 108. System 100 may further include a browser extension server 110, a financial service provider (FSP) system 112, a merchant system 114, and a service provider system 120. As shown, computing device 102, browser extension server 110, FSP system 112, merchant system 114, and service provider system 120 may be communicatively coupled by a network 116.

While only one computing device 102, browser extension server 110, FSP system 112, merchant system 114, service provider system 120 and network 116 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments.

Computing device 102 may be one or more computing devices configured to perform operations consistent with executing browser extension application 106 and with executing web browser application 108. Computing device 102 is further described below in connection with FIG. 3.

Browser extension application 106 may be one or more software applications configured to perform operations consistent with detecting data within web pages, such as detecting a type of the web page (e.g., whether a web page is a sign-in page, whether a user can place an order for a transaction, or whether the web page provides dynamic information about a product or service), detecting products placed in a shopping cart or prices offered for the products, etc. For example, browser extension application 106 may be configured to determine a type of web page that the user 104 and/or computing device 102 is visiting, and based on the type of the web page, detect a specific set of data on the web page. As an example, for a web page associated with an online retailer, the browser extension application can detect a list of items in the user 104's shopping cart, the price for each item, whether the user is checking out the items, etc. As another example, for a sign in page, the browser extension application can determine the type of account the user is intending to sign into, e.g., email, social media, etc., the user's 104's username and/or password, and whether any location identification information is provided to the service provider. The browser extension application can provide all of this information to the browser extension server 110, which aggregates this type of data from multiple users of the system.

In some embodiments, the browser extension application 106 may detect the data in web pages using, for example, one or more regular expressions. A regular expression may be defined as a sequence of characters that defines a search pattern. Example regular expressions may include, for instance, RegExp, RegEx, or POSIX regular expressions. Other regular expressions are possible as well.

In some embodiments, a regular expression may be configured for use in searching web pages according to a search pattern to detect elements such as, for example, text, fields, information received and/or additional elements in the web pages. In some embodiments, a regular expression may be configured for use in detecting, for example, transaction information and/or additional elements in programming language used to create the web pages, such as hypertext markup language (HTML) or extensible markup language (XML).

Web browser application 108 may be one or more software applications configured to perform operations consistent with providing and displaying web pages, such as web pages associated with merchants and service providers. The web pages may include account login fields, transaction fields, shopping carts, dynamic information (i.e., information targeted to a specific user), etc. Web browser application 108 is further described below in connection with FIG. 3.

Browser extension server 110 may be one or more computing devices configured to perform operations consistent with providing browser extension application 106. Browser extension server 110 may be further configured to perform operations consistent with receiving data from the browser extension application 106 and transmitting signals to the browser extension application 106. The signals can be configured to cause the browser extension application 106 display a warning to the user. Alternatively or additionally, browser extension server 110 may be further configured to perform operations consistent with receiving information from browser extension 106 and aggregating the data. Browser extension server 110 may also receive data from other sources and generate predictions about whether a particular web page is associated with illicit activity. Browser extension server 110 is further described below in connection with FIG. 2.

FSP system 112 may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art.

FSP system 112 may be one or more computing devices configured to perform operations consistent with maintaining financial service accounts, including a financial service account associated with user 104. FSP system 112 may be further configured to authenticate financial transactions associated with such financial service accounts. In particular, FSP system 112 may be configured to authenticate financial transactions associated with a financial service account associated with user 104. In some embodiments, FSP system 112 may be further configured to maintain a database of fraudulent transactions. FSP system 112 can provide this information to browser extension server 110 (and/or browser extension application 106) such that browser extension server 110 (and/or browser extension application 106) can make predictions about whether a web page is associated with illicit activity. In some embodiments, FSP system 112 may be further configured to generate content for a display device included in, or connected to, computing device 102, such as through a mobile banking or other application on computing device 102. Alternatively or additionally, FSP system 112 may be configured to provide content through one or more web pages or online portals that are accessible by computing device 102 over network 116. The disclosed embodiments are not limited to any particular configuration of FSP system 112.

While browser extension server 110 and FSP system 112 are shown separately, in some embodiments browser extension server 110 may include or be otherwise related to FSP system 112. For example, in some embodiments the facility of browser extension server 110 may be provided instead by FSP system 112, or vice versa. Alternatively or additionally, in some embodiments, browser extension server 110 may be included in, and/or be otherwise related to, any other entity in system 100 and/or a third-party not shown in system 100. Alternatively or additionally, browser extension server 110 may be a standalone server. Browser extension server 110 may take other forms as well.

Merchant system 114 may be one or more computing devices configured to perform operations consistent with providing web pages that are accessible by computing device 102 over network 116. For example, the web pages may be provided at computing device 102 through web browser application 108. In some embodiments, merchant system 114 may be associated with a merchant that provides goods or services. Further, in some embodiments, the web pages may be online retail web pages through which user 104 may engage in purchase transactions to purchase the merchant's goods or services. Other web pages are possible as well. The disclosed embodiments are not limited to any particular configuration of merchant system 114.

In some embodiments, merchant system 114 may include a merchant payment system 118. Merchant payment system 118 may be one or more computing devices configured to perform operations consistent with providing, within the web pages provided by merchant system 114, a merchant-provided payment process through which user 104 may engage in purchase transactions to purchase the merchant's goods or services. In some embodiments, merchant payment system 118 may be provided by the merchant in connection with one or more financial service providers, such as the financial service provider associated with FSP system 112 or another financial service provider. The payment process may, for example, be the same as or similar to MasterPass™ PayPal®, or Visa® Checkout. Other payment processes are possible as well.

Service provider system 120 may be one or more computing devices configured to perform operations consistent with providing web pages that are accessible by computing device 102 over network 116. For example, the web pages may be provided at computing device 102 through web browser application 108. In some embodiments, service provider system 114 may be associated with an email service provider, social media service provider, phone company or any other electronic communication service provider. Further, in some embodiments, the web pages may be email websites, social media websites, or other communications websites through which user 104 may communication messages and/or receive information from financial institutions. Other web pages are possible as well. The disclosed embodiments are not limited to any particular configuration of service provider system 120.

Network 116 may be any type of network configured to provide communication between components of system 100. For example, network 116 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
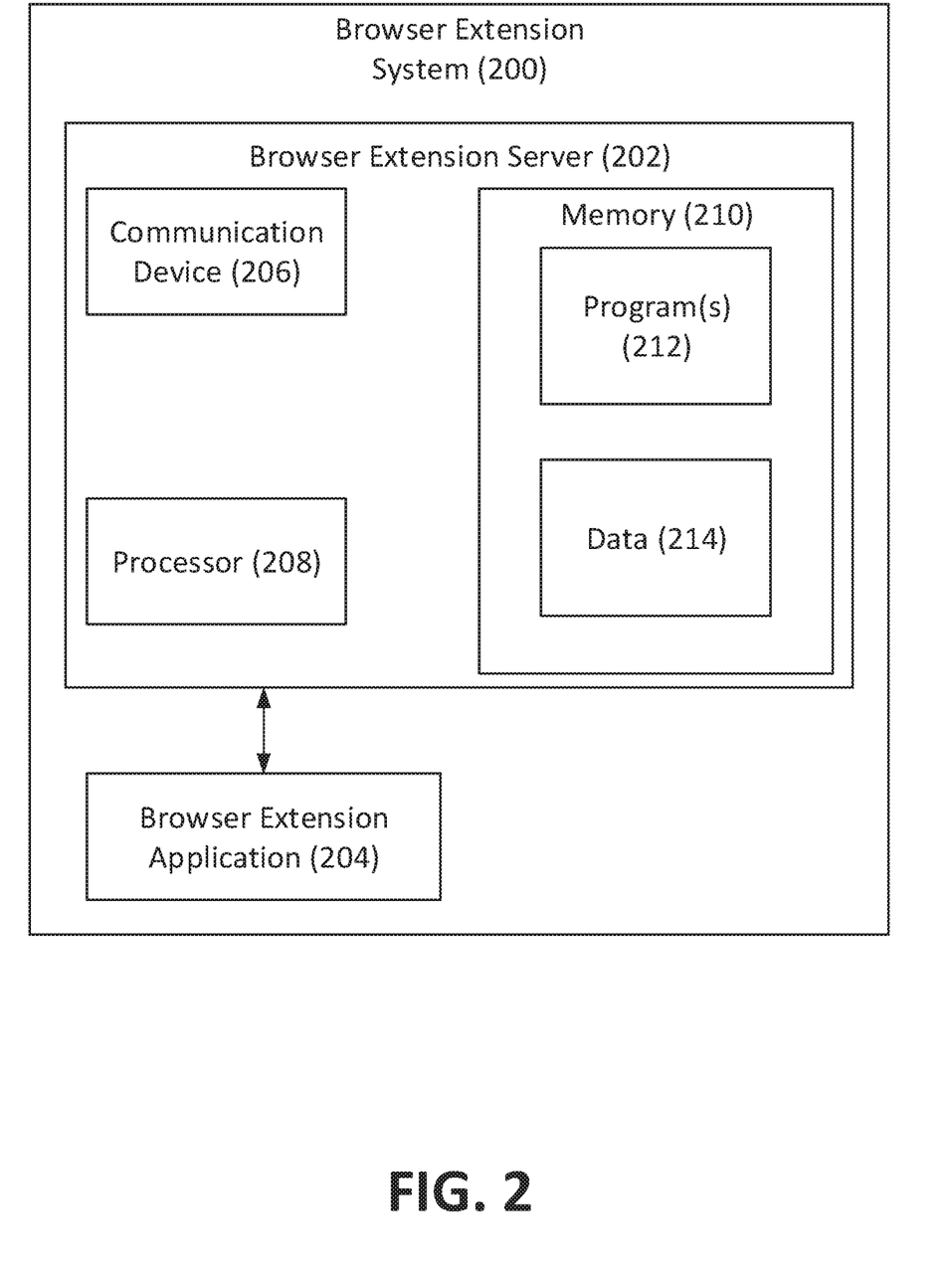
FIG. 2 is a block diagram of an exemplary browser extension system 200, consistent with disclosed embodiments.

FIG. 2 is a block diagram of an exemplary browser extension system 200, consistent with disclosed embodiments. As shown, browser extension system 200 may include browser extension server 202 and browser extension application 204. Browser extension server 202 may include a communication device 206, one or more processor(s) 208, and memory 210 including one or more programs 212 and data 214. Browser extension server 202 may be configured to perform operations consistent with providing browser extension application 204.

Browser extension server 202 may take the form of a server, general purpose computer, mainframe computer, or any combination of these components. Other implementations consistent with disclosed embodiments are possible as well. Browser extension application 204 may take the form of one or more software applications stored on a computing device, such as browser extension application 106 stored on computing device 102 as described above.

Communication device 206 may be configured to communicate with one or more computing devices, such as computing device 102. In some embodiments, communication device 206 may be configured to communicate with the computing device(s) through browser extension application 204. Browser extension server 202 may, for example, be configured to provide to browser extension application 204 one or more signals through communication device 206. As another example, browser extension server 202 may be configured to receive from browser extension application 204 data relating to web pages through communication device 206. Communication device 206 may be configured to communicate other information as well.

Communication device 206 may be further configured to communicate with one or more FSP systems, such as FSP system 112 described above. In some embodiments, the FSP system may provide transaction data such as a list of fraudulent transactions and other information associated with the fraudulent transactions. Communication device 206 may be configured to communicate with the FSP system(s) in other manners. Communication device 206 may be configured to communicate with other components as well.

Processor(s) 208 may include one or more known processing devices, such as a microprocessor from the Core™, Pentium™ or Xeon™ family manufactured by Intel®, the Turion™ family manufactured by AMD™, the "Ax" (i.e., A6 or A8 processors) or "Sx" (i.e. S1, . . . processors) family manufactured by Apple™, or any of various processors manufactured by Sun Microsystems, for example. The disclosed embodiments are not limited to any type of processor(s) otherwise configured to meet the computing demands required of different components of browser extension system 200.

Memory 210 may include one or more storage devices configured to store instructions used by processor(s) 208 to perform functions related to disclosed embodiments. For example, memory 210 may be configured with one or more software instructions, such as program(s) 212, that may perform one or more analysis based on data provided by the browser extension application 204 to determine whether a web page is associated with illicit activity.

In certain embodiments, memory 210 may store sets of instructions for carrying out the processes described below. Other instructions are possible as well. In general, instructions may be executed by processor(s) 208 to perform one or more processes consistent with disclosed embodiments.

The components of browser extension system 200 may be implemented in hardware, software, or a combination of both hardware and software, as will be apparent to those skilled in the art. For example, although one or more components of browser extension system 200 may be implemented as computer processing instructions, all or a portion of the functionality of browser extension system 200 may be implemented instead in dedicated electronics hardware.

In some embodiments, browser extension system 200 may also be communicatively connected to one or more database(s) (not shown). Alternatively, such database(s) may be located remotely from browser extension system 200. Browser extension system 200 may be communicatively connected to such database(s) through a network, such as network 116 described above. Such database(s) may include one or more memory devices that store information and are accessed and/or managed through browser extension system 200. By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data from the database(s).

Figure 3:
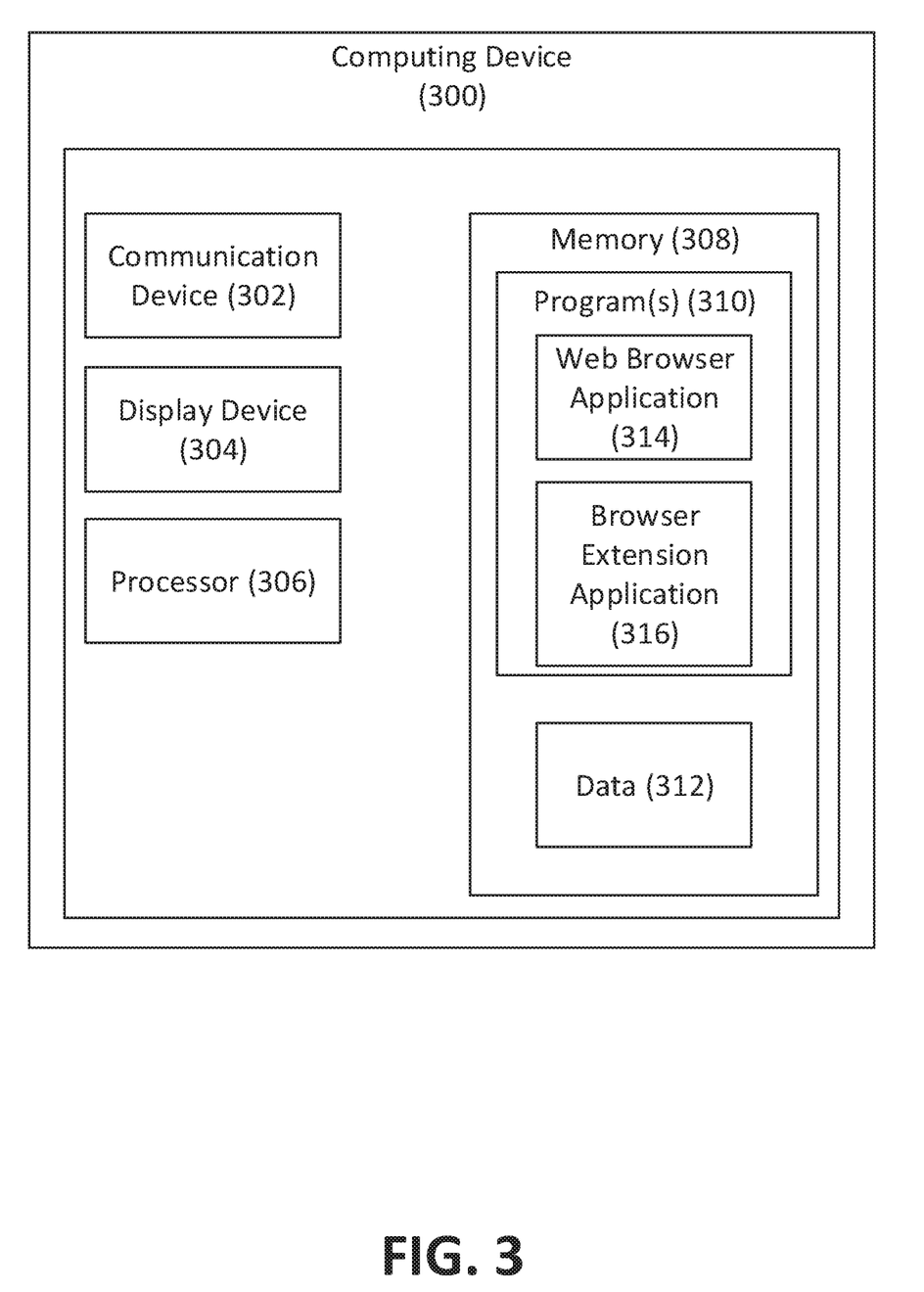
FIG. 3 is a block diagram of an exemplary computing device 300, consistent with disclosed embodiments.

FIG. 3 is a block diagram of an exemplary computing device 300, consistent with disclosed embodiments. As shown, computing device 300 may include communication device 302, display device 304, processor(s) 306, and memory 308 including program(s) 310 and data 312. Program(s) 310 may include, among others, web browser application 314 and browser extension application 316.

In some embodiments, computing device 300 may take the form of a desktop or mobile computing device, such as a desktop computer, laptop computer, smartphone, tablet, or any combination of these components. Alternatively, computing device 300 may be configured as any wearable item, including jewelry, smart glasses, or any other device suitable for carrying or wearing on a user's person. Other implementations consistent with disclosed embodiments are possible as well. Computing device 300 may, for example, be the same as or similar to computing device 102 described above.

Communication device 302 may be configured to communicate with a browser extension server, such as browser extension servers 110 and 202 described above. In some embodiments, communication device 302 may be further configured to communicate with one or more merchant systems, such as merchant system 114 described above, one or more FSP systems, such as FSP system 112 described above, and/or one or more service provider systems, such as service provider system 120. Communication device 302 may be configured to communicate with other components as well.

Communication device 302 may be configured to provide communication over a network, such as network 116 described above. To this end, communication device 302 may include, for example, one or more digital and/or analog devices that allow computing device 300 to communicate with and/or detect other components, such as a network controller and/or wireless adaptor for communicating over the Internet. Other implementations consistent with disclosed embodiments are possible as well.

Display device 304 may be any display device configured to display interfaces on computing device 300. The interfaces may include, for example, web pages provided by computing device 300 through web browser application 108. In some embodiments, display device 304 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 304 may also include one or more digital and/or analog devices that allow a user to interact with computing device 300, such as a touch-sensitive area, keyboard, buttons, or microphones. Other display devices are possible as well. The disclosed embodiments are not limited to any type of display devices otherwise configured to display interfaces.

Processor(s) 306 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor(s) 306 may also include various architectures (e.g., x86 processor, ARM®, etc.). The disclosed embodiments are not limited to any type of processor(s) otherwise configured to meet the computing demands required of different components of computing device 300.

Memory 308 may include one or more storage devices configured to store instructions used by processor(s) 306 to perform functions related to disclosed embodiments. For example, memory 308 may be configured with one or more software instructions, such as program(s) 310, that may perform one or more operations when executed by processor(s) 306. The disclosed embodiments are not limited to separate programs or computers configured to perform dedicated tasks. For example, memory 308 may include a single program 310 that performs the functions of computing device 300, or program(s) 310 may comprise multiple programs. Memory 308 may also store data 312 that is used by program(s) 310. In certain embodiments, memory 308 may store sets of instructions for carrying out the processes described below. Other instructions are possible as well. In general, instructions may be executed by processor(s) 306 to perform one or more processes consistent with disclosed embodiments.

In some embodiments, program(s) 310 may include web browser application 314. Web browser application 314 may be executable by processor(s) 306 to perform operations including, for example, providing web pages for display. The web pages may be provided, for example, via display device 304. In some embodiments, the web pages may be associated with a merchant system, such as merchant system 114 described above. Web browser application 314 may be executable by processor(s) 306 to perform other operations as well.

In some embodiments, program(s) 310 may further include a browser extension application 316. Browser extension application 316 may, for example, be the same as similar to browser extension applications 106 and 204 described above. Browser extension application 316 may be executable by processor(s) 306 to perform various operations including, for example, detecting and automatically populating transaction fields in web pages provided by computing device 300 through web browser application 314. Other instructions are possible as well. In general, instructions may be executed by processor(s) 306 to perform one or more processes consistent with disclosed embodiments.

The components of computing device 300 may be implemented in hardware, software, or a combination of both hardware and software, as will be apparent to those skilled in the art. For example, although one or more components of computing device 300 may be implemented as computer processing instructions, all or a portion of the functionality of computing device 300 may be implemented instead in dedicated electronics hardware.

In one example embodiment, a user can install a browser extension application on a computing device and visit a website using a web browser application of the computing device. The website can provide information to the user or seek information from the user. In some embodiments, the website can require the user to create an account or log in to provide information or seek information from the user. For example, a user can visit a website, which requires a user to create a username and password to visit the website. As part of the process for creating an account with the website, the website can ask the user to provide personal and/or financial information, e.g., name, age, address, preferences, credit card number, bank account number, photo, voice sample, video sample, etc. If the website is not secure or it is associated with criminal activity, the website can exploit the user's personal and/or financial information, e.g., open up credit card accounts, purchase products using the user's credit card information, or even sell the user's information. The browser extension application can transmit data relating to the user's visit to and interaction with the website. For example, the browser extension application can transmit to a browser extension server the website address. Additionally, the browser extension application can detect the information requested on the website and the responses provided by the user. For example, using RegExp, RegEx, or POSIX regular expressions, the browser extension application can determine the types of information that the website asks for and classify the information as personal, financial, relating to opening an account, relating to logging into an account or relating to purchasing a product. Additionally, the browser extension application can use RegExp, RegEx, or POSIX regular expressions to determine the information the user enters into the fields on the website. In one example embodiment, the browser extension application can determine the types of information to collect based on the type of the information requested on the page (and/or a type of the webpage). The browser extension application can transmit the information requests provided by the website and the information entered by the user on the website to the browser extension server.

As another example, a user can visit a website to place an online order. For example, the user can visit a website for an online retailer which provides a list of products for sale. The user can place various products in an electronic shopping cart and can proceed to check out. The browser extension application can analyze the information displayed on the checkout page. The browser extension application can provide a list of items in the shopping cart. Additionally, the browser extension application can detect various requests listed by the website, e.g., provide email address or username. In response to the user entering data into various fields of the webpage, the browser extension application can transmit data to the browser extension server. The data can relate to the items in the user's electronic shopping cart (e.g., names, prices, quantities, discounts, etc.), the information requested from the user on the website (e.g., username, password, credit card number, royalty account number, etc.) and the information provided by the user on the website (e.g., the user's username, password, credit card number, royalty account number, etc.).

In one example embodiment, the browser extension application determines to collect the data based on the keywords that appear on a website or webpage. For example, the browser extension application can store keywords relating to various types of websites, e.g., for a webpage which allows the user to create an account, the browser extension application can store various sets of keywords such as "sign up" or "create new account"; for a webpage which allows the user to purchase products, the browser extension application can store keywords such as "shopping cart", "add to the cart", "pay" or "check out". Based on the keywords that appear on the webpage, the browser extension application can classify a webpage and look for specific types of information. For example, if the webpage is classified as a webpage for creating an account, the browser extension application can seek personal information. If the webpage is classified as a webpage for ordering products, the browser extension application can seek information such as product information, quantity of products ordered, website response time, and any financial information provided by the user to the website.

In one example embodiment, upon visiting a website (and/or each webpage of the website), the browser extension application can transmit the web address for the webpage to the browser extension server. In response, the browser extension server can provide information about the webpage and/or website to the browser extension application, e.g., the website is associated with fraudulent activity. Additionally, the browser extension server can provide information about the types of information to look for on the webpage and types of responses to record from the user. Once the user enters the information, the browser extension application can provide the user's response to the browser extension server.

In one example embodiment, the browser extension application can classify and collect information on a webpage based on a prediction of a machine learning or predictive model. For example, the browser extension application can receive the machine learning or predictive model from the browser extension server. The predictive model can be developed by machine learning algorithms. In an embodiment, the machine learning algorithms employed can include at least one selected from the group of gradient boosting machine, logistic regression, neural networks, and a combination thereof, however, it is understood that other machine learning algorithms can be utilized. In an embodiment, the predictive model can be developed using foundational testing data generated by labeled website data. The labeled website data can be stored on databases associated with the browser extension server. The labeled website data can include, e.g., a text of a webpage, an assignment of the text with requests, a classification for the webpage and a set of information to be collected from a user input on the page.

The predictive model can include continuous learning capabilities. In some examples, the database(s) can be continuously updated as new data is collected, e.g., each time the predictive model makes a prediction, the user can confirm or reject the model's prediction in a user interface of the computing device (and the browser extension application can transmit this data, i.e., the prediction and the user's input, to the browser extension server). The new data can be incorporated into the training of the predictive model, so that the predictive model reflects training based on data from various points in time and by various users. For example, when a user is browsing a website, based on the content of the webpage, the prediction model can make a prediction about the webpage, e.g., a page for ordering products. The browser extension application can display the prediction in a popup window to the user and ask the user to confirm the prediction. The user can provide input to the browser extension application, which can in turn transmit the user's input (and the content of the webpage) to the browser extension server and used as verified labeled data for training the predictive model.

Initially, there may not be sufficient foundational testing data available to develop the predictive model. Accordingly, the initial model development can be performed using predetermined classifications as a proxy target and website data available from other sources as features (e.g., data collected from other users). By doing so, the predictive model can begin to form its understanding of webpages. The results of this initial modeling can support the initial status of the predictive model, and the model can be continuously improved as data from users becomes available. Once trained, the predictive model can be utilized to predict a type of a webpage and the types of information that should be gathered on the webpage, e.g., the information that the website requests and the information that the user provides.

In some examples, the predictive model can be stored on the computing device (i.e., the webpage data and the predictive model are located on the same system). Locally storing the model can realize the benefit of reduced response times where predictions and trigger signals can be more quickly issued. In other examples, the predictive model can be stored on the cloud, which can allow for centralized maintenance of the predictive model and greater accessibility of the model for training. In examples where the predictive model is locally stored, the predictive model can be trained on the cloud and synchronized across the local computing devices. Alternatively, the predictive model can be trained continuously when locally stored and synchronized across computing devices.

In one example embodiment, the browser extension can utilize a natural language processing module to determine a type of a webpage and/or information to collect from a webpage. Natural language processing (NLP) technology is capable of processing and analyzing natural language data, which can involve speech recognition, natural language understanding, and natural language generation. The NLP module can include software which when executed by a processor can perform tasks associated with processing and analyzing natural language data. For example, the NLP module can include different submodules, such as Natural Language understanding (NLU) submodule, natural language generation (NLG) submodule, and Sentiment Analysis submodule. The NLU submodule can process incoming text and derive meaning from the text. The NLG submodule can take a meaning that is to be communicated and express that meaning in appropriate text. The Sentiment Analysis submodule can determine a polarity and topic of a text that expresses feelings or opinions.

In one example embodiment, the NLP module can analyze text and determine the general subject matter(s) to which the text refers. For example, the NPL module can analyze the text appearing in a webpage and determine the concepts to which the text and/or webpage pertains, e.g., shopping, creating an account, logging in an account, or entering a username. The NLP module can provide this information to the browser extension application, which can transmit the information (and/or other information detected suing the predictive model) to the browser extension server. Additionally, the NPL module can analyze the text next to the fields in a webpage and determine the subject matter to which the text belongs, e.g., opening a new account or ordering a product. In one example embodiment, the predictive model can use input from the NPL module to determine the type of a webpage and the information that should be gathered on a webpage.

In one example embodiment, the browser extension server can receive data from a plurality of computing devices. Each computing device can provide data such as a browsing history for the respective user of the computing device (as the user visits websites or after the user's visit to one or more websites). The browsing history can include a time of visit to a website, an address for the website, an amount of time spent on various pages of the website as broken by page, the website addresses for the pages that the user visited before and/or after the user visited the website, an address for a page or link which directed the user to the website, an account in which the user logged in before the user arrived at the website, an identification of a banner advertisement on which the user clicked before arriving at the website, and a content of the banner advertisement.

In one example, the computing device can transmit to the browser extension server the data requested on each website visited by the user and the data provided by the user to the website. For example, the browser extension application can analyze each webpage and determine a type for the webpage, e.g., an account sign up page, an account log in page, a product order page, or other. As another example, the browser extension application can detect the fields on a webpage and determine the text within the vicinity of each field to determine a type of information requested by the webpage. As yet another example, the browser extension application can detect the fields on a webpage and determine the text that is entered and/or selections that is made by the user in each field. The browser extension application can decide which text to transmit to the browser extension server based on, e.g., the type of the webpage and/or the type of information requested on the webpage. For example, on an account sign up page which requests a name of the user and a CAPTCHA, the browser extension application can determine to transmit the user's name, but not to transmit the CAPTACHA entered by the user. As another example, on a webpage for an online retailer where a user can order a product, the webpage can ask for the user's shipping address and require a selection of whether the user desires the items to be on an expedited basis. The browser extension can decide to transmit the shipping address, but not the user's request to ship the item quickly.

The selection of which information to collect on a webpage can be based on whether the information to be collected can trace a fraudulent activity to a prior webpage visit. For example, when a user enters the user's credit card number on a webpage, the user's credit card number can connect the website to a fraudulent transaction on the credit card, e.g., the website might have misappropriated the user's credit card number. As another example, when a user enters the user's mother's maiden name on a website, the website can be connected to an instance of resetting the user's password based on the user's mother's maiden name.

In one example embodiment, the browser extension server can receive data from a service provider system. The service provider system can be an email service provider, a social media platform or an electronic account platform (e.g., utility company, music streaming service, etc.). The data can describe instances of unauthorized access or attempted access to an account (e.g., email, social media, etc.) hosted by the service provider system. For example, the data can describe instances in which an account is hacked. The data can include a time and date for hacking, an IP address from which the account was accessed, a description code for an illicit action taken using the hacked account (e.g., a unique code for spreading spam emails, another unique code for transferring funds, yet another unique code for downloading documents from the account, etc.). In one example embodiment, the data can include a type of information which was used for getting access (or unauthorized access) to the account. For example, if the account was accessed by using the password (which was obtained without authorization), the data can explain that the account was accessed using the password.

As another example, the data can describe instances in which an account is subject to a request for resetting the password (or changing the password). In one example, the data includes only instances in which a password reset or change request is submitted by someone other than the user. For example, when a password reset request is submitted, the service provider system can send an email, notification or communication to an owner of the account, notifying the owner about the submission of the request and ask the owner to confirm if the owner submitted the request. The data can include only instances in which the owner of the account did not confirm that the owner submitted the request. The data can include a time and date for the request, an IP address from which the request was submitted, and a number of times the request was submitted. In one example embodiment, the data can include a type of information which was used for resetting the password for the account. For example, if the password was reset by using a mother's maiden name, the data can explain that the password was reset using the mother's maiden name.

As another example, the data can describe instances in which an account is locked. The data can include a time and date when the account was locked, a number of times the account's password was attempted before the account was locked, the term that was entered as the password, and an IP address from which access to the account was sought. The term that was tried as the password can potentially connect the attempted access to a prior visit if there is a match between the entered password and an entry on another website.

In one example, the data can describe instances in which an account is used for illicit purposes, e.g., sending spam emails. For example, the data can include a time and date when the account used to send spam emails, a number of times the account sent spam emails, email addresses to which the spam emails were sent, a content of the spam emails and an IP address from which the account was accessed to send the spam emails. The content of the spam emails can potentially be used to connect the spamming to a prior visit if there is a match between the content and an entry on another website or the website address.

In one example embodiment, the browser extension server can receive data from an FSP system. For example, the FSP system can belong to a bank or financial institution which provides financial services. The FSP system can maintain various databases relating to a plurality of financial accounts, e.g., credit card accounts, checking accounts, e-commerce accounts, cryptocurrency accounts, etc. The FSP system can also be in communication with one or more databases which maintain transaction data. The transaction data can include data relating to credit card or bank account transactions. The transaction data can include fraudulent transaction data, e.g., unauthorized credit card transactions. These transactions can be the transactions that an account owner disputed as fraudulent or the FSP system' fraud identification module identified as fraudulent. The fraudulent transaction data can include a date and time for the transaction, an amount, a merchant name, a merchant category, a name of the account holder, a transaction currency denomination, etc.

In one example embodiment, the browser extension server can receive data from a merchant system. The merchant system can maintain various databases including transaction data. These transactions may have been processed by a merchant payment system. Some of these transactions have been identified as fraudulent, e.g., after receiving a complaint from a customer or a financial institution, or after a fraud identification module identified the transaction as fraudulent. The browser extension server can receive form the merchant system the data for these fraudulent transactions. The data can include a transaction time and date, a list of items included in the transaction, a price for each item, a total price, a shipping address, a purchaser name, etc.

In one example embodiment, the browser extension server can receive data from a service provider system. The service provider system can be a phone company or a cellphone company. The data can include a time and date for a phone call, a duration of the call and a calling number.

In one example embodiment, the browser extension server can analyze the data provided to the browser extension server and determine whether a website is associated with illicit activity, i.e., the likelihood that if a user interacts with the website, the user will experience a fraudulent transaction or hacking incident (or other criminal and/or illegal conduct described herein). In particular, the browser extension server can analyze and correlate website visit data with unauthorized access (or attempted unauthorized access) of accounts and/or fraudulent transactions. In one example, the website visit data can include a user's visit to a webpage, a time and date for the visit, and a type of engagement (or information shared) with the website. The type of engagement (or information) can include, e.g., providing a username and password, providing personal information, providing financial information and/or ordering products. The website visit data can also include other data which can be gathered by the browser extension application described throughout this disclosure.

In one example, the data representing fraudulent transactions can include credit card fraud data, merchant fraud data, etc. In one example, the data representing unauthorized access (or attempted unauthorized access) of accounts can include data that describes instances in which an account is hacked. One of ordinary skill it the art recognizes that other data described herein can also be used for as fraud or access data. For example, this data can include the data that can describe instances in which an account is subject to a request for resetting the password or the data that includes only instances in which a password reset is submitted by someone other than the user.

In one example, the browser extension server can correlate the website visit data with instances of fraud and/or unauthorized access data. For example, the browser extension server can match instances of website visit with instances of fraud. In one example, the website visit data can include a time and date for the visit and a username, password and credit card number which was provided to the website. The fraud data can include a time and date for the fraudulent transaction, a username, a password and a credit card which was used in an unauthorized transaction. The browser extension server can determine whether these two datasets match, e.g., the time and date of the transaction are after the time and date of the website visit; the username and/or password used to commit the fraudulent transaction closely match (within a threshold value) or are identical to the username and/or password provided to the website; and the credit card used in the fraudulent transaction is the same as the credit card provided to the website. After matching the various datasets, the browser extension server can determine a likelihood that visits to a website will result in instances of fraud.

In one example embodiment, the browser extension server can store a list of all transactions that have occurred. This list includes merchant ID's and times for the transactions. Some of these transactions can be marked as fraudulent by the customers. The browser extension application can provide information indicating when a purchase occurs by a user. The browser extension server can match the time, purchase amount and then cross correlate to find merchant IDs. Then, the browser extension server can identify when fraud often occurs on a given website. This is information enables the user to understand whether a user interacting on a given website experiences fraud more often than others.

In one example embodiment, the browser extension server can determine whether a website is associated with delayed fraud. For example, in the case of delayed fraud, the fraudulent activity may occur by someone other than the merchant (or the fraudulent activity may occur long after the interaction with the website). In this case, the browser extension server can identify all cases of fraud for a given timeframe, e.g., 1 month, after detecting an interaction with a website. The browser extension server then clusters all cases of fraud and determines all the merchants the users purchased from over a time period, e.g., last 12 months. The browser extension server then normalizes the ratio of fraud to prior purchases at a given merchant, e.g., if there were 10 purchases at a website and 1 was fraudulent, the ratio of fraud would be 0.1. The browser extension server will then take the zscore of the ratio of fraud, which would provide a number representing how many standard deviations from the norm a given website is. In way of an example, anything above a zscore of 2 (representing 2 standard deviations above the norm) would probably be a "very high risk" transaction, anything above 3 would probably be blocked by the browser extension server, e.g., via a notification to the bank.

In one example embodiment, when a user visits a webpage, the browser extension application can determine the type of the webpage. For example, using a predictive model, the browser extension application can determine the webpage is one of the following predetermined types of webpages, e.g., a webpage for signing in, a webpage for logging in, a webpage for ordering products, or other. If the browser extension application decides that the webpage is one of the predetermined webpages, the browser extension can gather various data from the webpage, e.g., the types of information requested by the webpage as well as the types of information provided by the webpage. The browser extension application can provide this information to the browser extension server.

The browser extension server can use the data provided by the browser extension application to make a determination as to whether the user is about to engage into a risky transaction (e.g., signing up or purchasing a product on a website that is likely going to exploit the user's financial and personal information). If the browser extension server determines that the user is about to engage in a risky transaction, the browser extension server can transmit a signal to the browser extension application to warn the user and/or take remedial action.

In one example embodiment, in response to receiving the signal, the browser extension application can display a message in a popup window to the user, e.g., "YOU ARE ABOUT TO ENGAGE IN A RISKY TRANSACTION." The pop up window can include one or more buttons, which can enable the user to ask for more information. In response to pressing the button, the browser extension application can retrieve the information from the browser extension server and display the information to the user.

In one example embodiment, in response to receiving the signal, the browser extension application can close the web browser application used by the user or direct the user to another website, e.g., a website that warns the user about the dangers of interacting with the current website. In one example embodiment, in response to receiving the signal, the browser extension application can log the user out of the account in which the user is logged in. In one example embodiment, in response to receiving the signal, the browser extension application can delete the products added to the user's electronic shopping cart. In one example embodiment, in response to receiving the signal, the browser extension application can identify one or more fields in the webpage and type a message in the fields to the user, the message including a plurality of letters and/or being a warning message. In one example embodiment, the prediction model can disable one or more fields on the webpage such that the user will not be able to provide information to the webpage.

Figure 4:
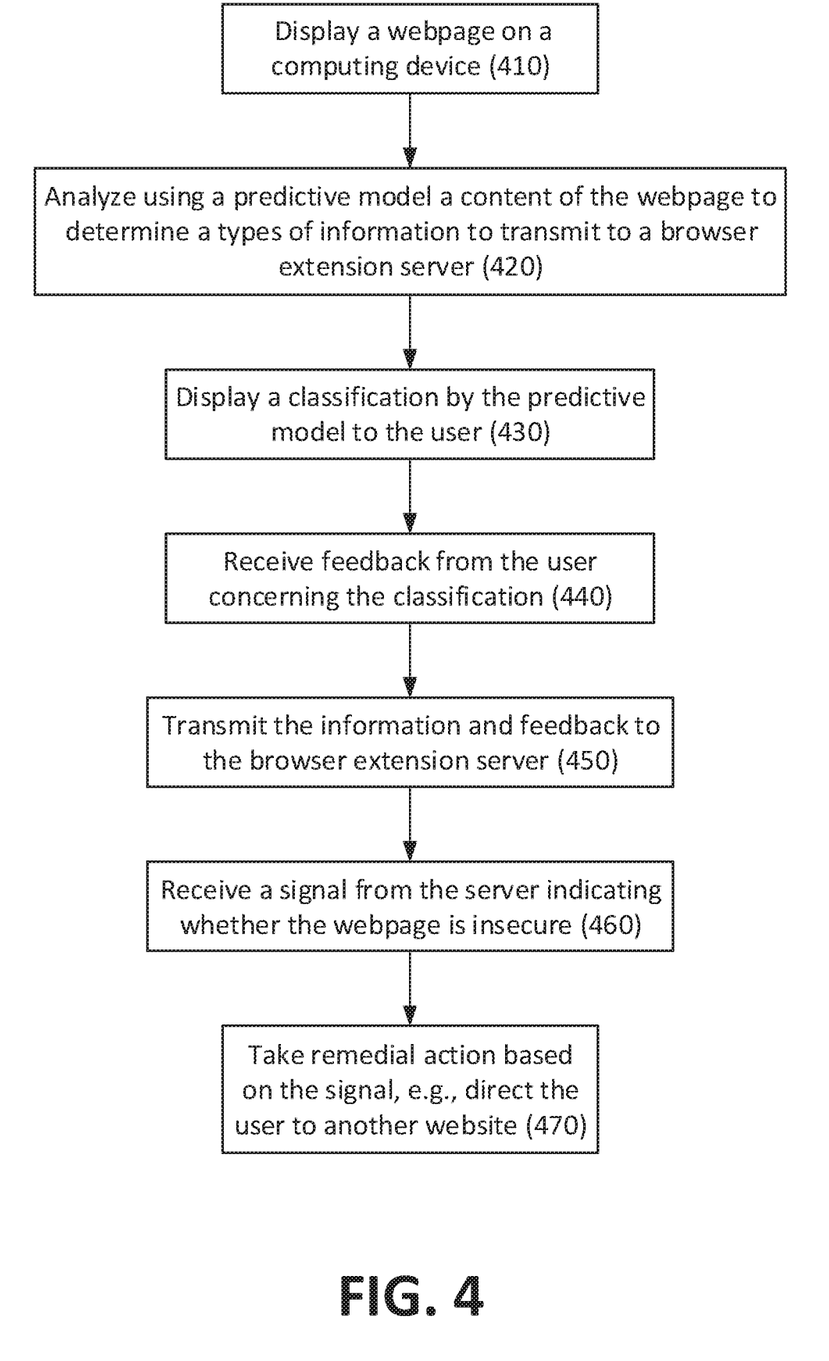
FIG. 4 shows an example flow chart for collecting and transmitting data using a browser extension application.

FIG. 4 shows an example flow chart for collecting and transmitting data using a browser extension application. In this example embodiment, in step 410, a computing device is asked by a user to display a webpage on a web browser application. In step 420, the browser extension application analyzes the text on the webpage to determine the type of the webpage and the type of information to gather from the webpage. For example, using a predictive model, the browser extension application determines that the webpage is an account sign up page and determines that user input including information such as user's username, password, date of birth and credit card should be collected.

In step 430, the browser extension application can display the classification of the webpage to the user, and in step 440, the browser extension application can receive feedback from the user concerning the classification of the webpage using the predictive model.

In step 450, the browser extension application can transmit the gathered data and the feedback to a browser extension server. The data can include a time and date of visit to the webpage, a webpage address and various other information gathered on the webpage.

In step 460, the browser extension application can receive a signal from the browser extension server, the signal can instruct the browser extension application to take an action, e.g., close the web browser application or direct the user to another webpage.

In step 470, the browser extension application can implement the action provided in the signal. For example, the browser extension application can close the web browser application or direct the user to another webpage.

Figure 5:
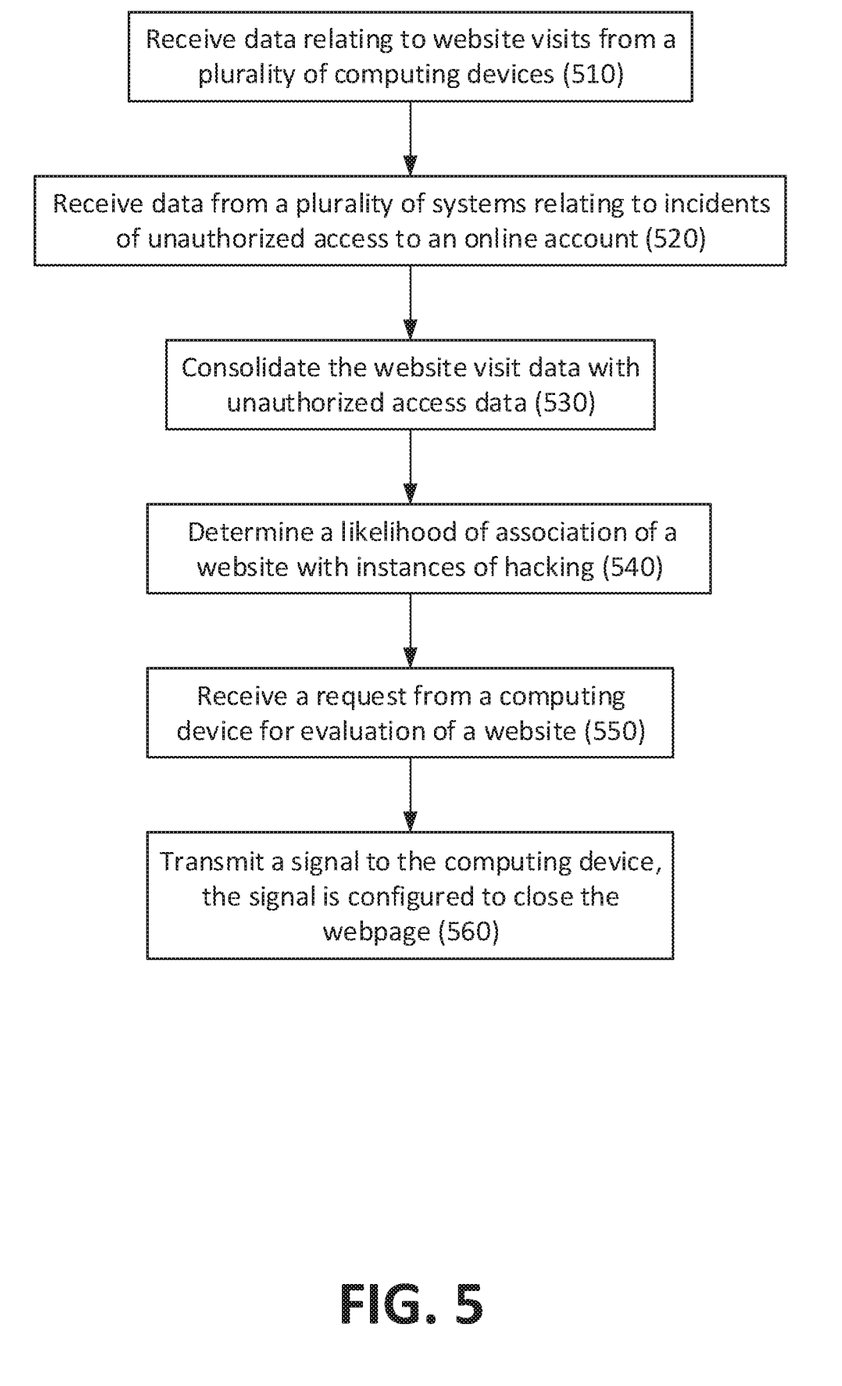
FIG. 5 shows an example flow chart for analyzing data provided by browser extension applications.

FIG. 5 shows an example flow chart for analyzing data provided by browser extension applications. In step 510, the browser extension server can receive data from a plurality of computing devices. The data can relate to website visits by the respective users of the computing devices. The website visit data can include a time and date for each visit, a webpage address, a duration of the visit, one or more data points concerning information provided by the user to the webpage, etc.

In step 520, the browser extension server can receive fraud data from a plurality of systems, e.g., FSP system, service provider system, merchant system, etc. The fraud data can indicate an unauthorized access (or attempted access) to an online account or an unauthorized transaction. The fraud data can include a time and date for a fraudulent activity, an account associated with the fraudulent activity, and a data point which can connect the fraudulent activity to the previous website visit, e.g., a password, a username, a credit card number, etc.

In step 530, the browser extension server can consolidate the website visit data received from the computing devices with fraud data received from other sources, and in step 540, the browser extension server can determine a likelihood for a webpage to be related to an incidence of fraud (e.g., if a user enters sensitive data on the webpage, what is the likelihood that the user will experience an incident of fraud within a threshold number of days?).

In step 550, the browser extension server can receive a request from a computing device, the request can indicate that a user of the computing device is visiting a webpage. In step 560, the browser extension server can transmit a signal to the computing device. The signal can indicate the likelihood that the webpage is related to fraudulent activity. The signal can also prevent the user from any further interacting with the webpage, e.g., redirect the user to another webpage which displays statistics about fraud on the webpage.

Figure 6:
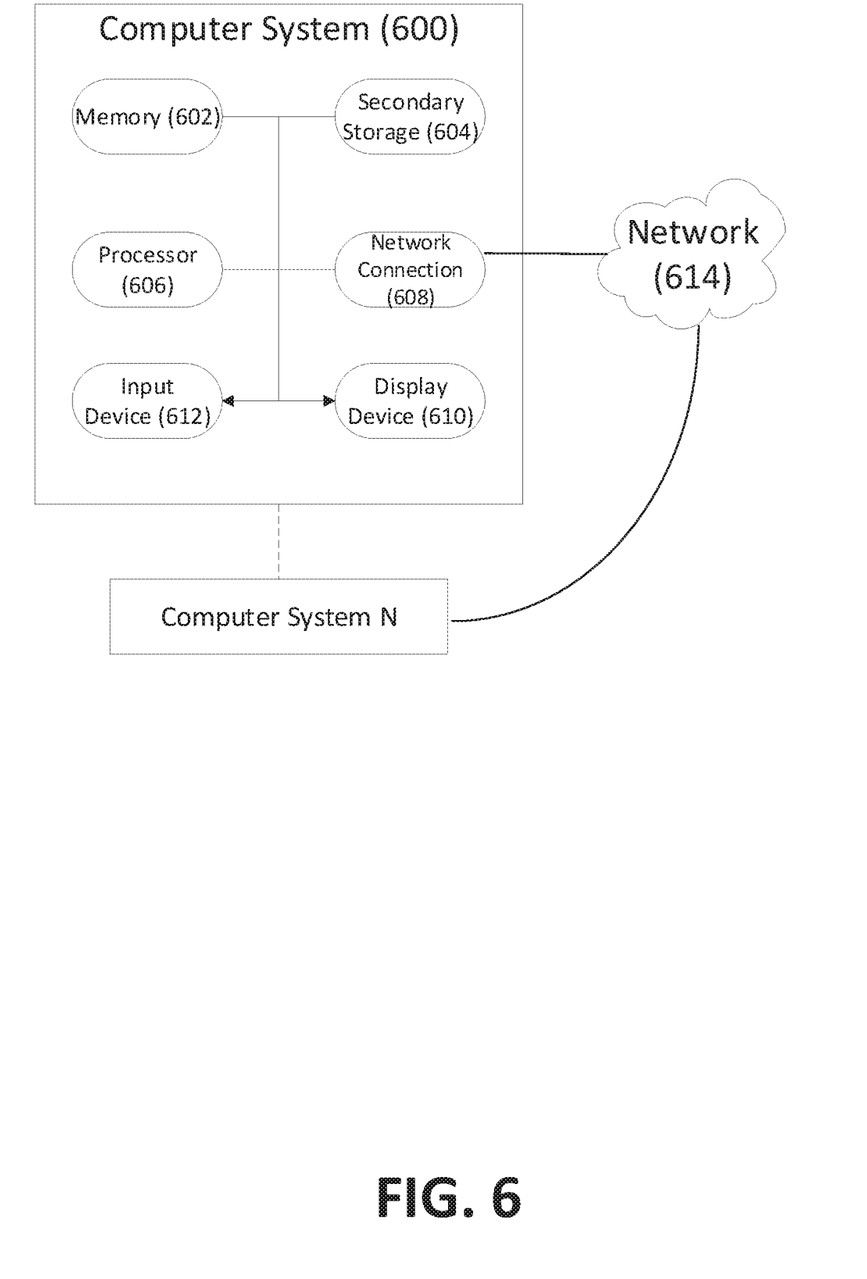
FIG. 6 illustrates exemplary hardware components of a server system and/or computing device.

FIG. 6 illustrates exemplary hardware components of a server system and/or computing device. A computer system 600, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 600, may run an application (or software) and perform the steps and functionalities described above. Computer system 600 may connect to a network 614, e.g., Internet, or other network, to receive inquiries, obtain data, and transmit information and incentives as described above.

The computer system 600 typically includes a memory 602, a secondary storage device 604, and a processor 606. The computer system 600 may also include a plurality of processors 606 and be configured as a plurality of, e.g., bladed servers, or other known server configurations. The computer system 600 may also include a network connection device 608, a display device 610, and an input device 612.

The memory 602 may include RAM or similar types of memory, and it may store one or more applications for execution by processor 606. Secondary storage device 604 may include a hard disk drive, floppy disk drive, CD-ROM drive, or other types of non-volatile data storage. Processor 606 executes the application(s), such as those described herein, which are stored in memory 602 or secondary storage 604, or received from the Internet or other network 614. The processing by processor 606 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 600 may store one or more database structures in the secondary storage 604, for example, for storing and maintaining the information necessary to perform the above-described functions. Alternatively, such information may be in storage devices separate from these components.

Also, as noted, processor 606 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 600.

The input device 612 may include any device for entering information into the computer system 600, such as a touch-screen, keyboard, mouse, cursor-control device, microphone, digital camera, video recorder or camcorder. The input and output device 612 may be used to enter information into GUIs during performance of the methods described above. The display device 610 may include any type of device for presenting visual information such as, for example, a computer monitor or flat-screen display (or mobile device screen). The display device 610 may display the GUIs and/or output from sub-system components (or software).

Examples of the computer system 600 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 600 is shown in detail, system 600 may use multiple computer systems or servers as necessary or desired to support the users and may also use back-up or redundant servers to prevent network downtime in the event of a failure of a particular server. In addition, although computer system 600 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 600, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method comprising:
receiving, at a first server, first browser extension data from a plurality of provider client devices, wherein the first browser extension data from each provider client device includes a first website address, a first time of visit and a piece of information shared by the provider client device on the first website address;
receiving, at the first server, fraud transaction data from a third-party server, wherein:
the fraud transaction data is associated with an account, and
the fraud transaction data includes an account number, a transaction amount, a transaction date and an identification code;
associating, by the first server, the fraud transaction data with the first browser extension data by matching first website address, the first time of visit or the piece of information shared by the provider client device on the first website address with the account number, the transaction amount, the transaction date or the identification code;
generating, by the first server, a list of websites associated with fraudulent activity based on the association;
receiving, at the first server, second browser extension data from a requesting client device, wherein the second browser extension data includes a second website address;
determining, by the first server, whether the second website address is included on the list of websites, and in response to a determination that the second website address is included on the list of websites, transmitting a warning signal to the requesting client device, wherein the warning signal is configured to disable a field on a webpage to be displayed on the requesting client device; and
retrieving, by the first server, from a third-party database of the third-party server, third-party information relating to the identification code;
retrieving by the first server, from the first database of the first server first information relating to the first website address; and
determining, by the first server, a degree of similarity between the third-party information relating to the identification code and the first information relating to the first website address,
wherein the determining is performed using a natural language processing technique.

2. The method of claim 1, wherein the piece of information includes a username and a password.

3. The method of claim 2, wherein associating the fraud transaction data with the first browser extension data includes associating the account number and the transaction amount with the piece of information.

4. The method of claim 3, further comprising associating the transaction date with the first time of visit, wherein the transaction date is associated with the first time of visit when the transaction date is within a threshold number of days of the first time of visit.

5. The method of claim 3, wherein associating the account number with the piece of information is executed using a database including all names and account numbers of account holders.

6. The method of claim 3, wherein generating the list of websites associated with the fraudulent activity includes, for each instance of the fraud transaction data being associated with the first browser extension data, adding the first website address to the list of websites associated with the fraudulent activity.

7. The method of claim 6, wherein the first website address is added to the list of websites associated with the fraudulent activity when there are at least a threshold number of fraud transaction data points indicating the identification code is associated with the first website address.

8. The method of claim 6, wherein the first website address is added to the list of websites associated with the fraudulent activity when there are at least a threshold number of fraud transaction data points indicating the identification code is associated with the first website address within a predetermined period of time of the transaction date and the first time of visit.

9. The method of claim 1, wherein the warning signal is configured to cause the requesting client device display a message indicating that the second website address is fraudulent.

10. The method of claim 1, wherein the warning signal includes statistics about a rate of fraud occurrence related to the second website address.

* * * * *